US012665812B2

(12) United States Patent (10) Patent No.: US 12,665,812 B2
Akashi et al. (45) Date of Patent: Jun. 23, 2026

(54) NETWORK MANAGEMENT SYSTEM, NETWORK MANAGEMENT METHOD, AND COMPUTER PROGRAM

(71) Applicant: Hitachi, Ltd., Tokyo (JP)

(72) Inventors: Dai Akashi, Tokyo (JP); Takeshi Shibata, Tokyo (JP); Nodoka Mimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 41 days.

(21) Appl. No.: 18/832,971

(22) PCT Filed: Feb. 2, 2023

(86) PCT No.: PCT/JP2023/003347
§ 371 (c)(1),
(2) Date: Jul. 25, 2024

(87) PCT Pub. No.: WO2023/157654
PCT Pub. Date: Aug. 24, 2023

(65) Prior Publication Data
US 2025/0158885 A1 May 15, 2025

(30) Foreign Application Priority Data
Feb. 17, 2022 (JP) ................................. 2022-022920

(51) Int. Cl.
*H04L 41/084* (2022.01)
*H04L 41/142* (2022.01)
(52) U.S. Cl.
CPC .......... *H04L 41/084* (2013.01); *H04L 41/142* (2013.01)

(58) Field of Classification Search
CPC ..... H04L 41/084; H04L 41/142; H04L 41/50; H04L 43/08
See application file for complete search history.

(56) References Cited

U.S. PATENT DOCUMENTS 10,791,168 B1 * 9/2020 Dilley ................. H04L 43/0817
10,924,429 B1 * 2/2021 Gupta ................... H04L 47/788
(Continued)

FOREIGN PATENT DOCUMENTS

JP          2020-140276 A      9/2020
WO      WO 2011/158322 A1    12/2011
WO      WO 2021/064874 A1     4/2021

OTHER PUBLICATIONS

Japanese-language Office Action issued in Japanese Application No. 2022-022920 dated Dec. 17, 2024 with English translation (7 pages).
(Continued)

*Primary Examiner* — Patrice L Winder
(74) *Attorney, Agent, or Firm* — Crowell & Moring LLP

(57) ABSTRACT
A system for managing a network system including an edge server on which an application is executed and a core network of a mobile network connected to the edge server is constructed. The system sets a parameter value group determined by using a setting template associated with an application requirement suitable for an application requirement of the user in the network system. The setting template includes a template parameter value (a parameter value as a template) for each parameter item related to the network system. The system monitors a status of the network system in which the parameter value group is set, and updates the setting template or determines a value displayed based on the setting template based on a result of the monitoring.

7 Claims, 13 Drawing Sheets

(56)          References Cited

U.S. PATENT DOCUMENTS

| 11,469,954 | B2 * | 10/2022 | Parvataneni | ........ | H04L 41/5025 |
| 2011/0307591 | A1 | 12/2011 | Sugata et al. | | |
| 2014/0019597 | A1 * | 1/2014 | Nath | .................. | H04L 41/0843 |
| | | | | | 709/220 |
| 2018/0300124 | A1 * | 10/2018 | Malladi | .................. | H04L 67/12 |
| 2020/0366559 | A1 * | 11/2020 | Parvataneni | ........ | H04L 41/5025 |
| 2021/0306938 | A1 * | 9/2021 | Seetharaman | ...... | H04L 41/5051 |
| 2022/0159062 | A1 | 5/2022 | Shen et al. | | |
| 2023/0024965 | A1 * | 1/2023 | Chen | ....................... | H04L 67/10 |

OTHER PUBLICATIONS

International Search Report (PCT/ISA/210) issued in PCT Application No. PCT/JP2023/003347 dated Apr. 25, 2023 with English translation (5 pages).

* cited by examiner

FIG. 4

APPLICATION REQUIREMENT TABLE
400

| 401 | 402 | 403 | 404 | 405 | 406 |
| --- | --- | --- | --- | --- | --- |
| REQUIREMENT ID | BASIC REQUIREMENT | NETWORK TYPE | SETTING PARAMETER | SLA PARAMETER | TUNING POLICY |
| 1-1 | APPLICATION 1 UE GROUP 1 NUMBER OF UEs 100 | NETWORK TYPE 1 | INSTANCE SIZE standard NW BAND 10Mbps COST ¥15,000/MONTH TEMPERATURE 30°C ... | PER10$^{-2}$ | TUNING POLICY 1 |
| 2-2 | APPLICATION 2 UE GROUP 2 NUMBER OF UEs 200 | NETWORK TYPE 2 | ... | ... | TUNING POLICY 2 |
| 3-3 | APPLICATION 3 UE GROUP 3 NUMBER OF UEs 300 | NETWORK TYPE 3 | ... | ... | TUNING POLICY 3 |
| ... | ... | ... | ... | ... | ... |

FIG. 5

UE GROUP TABLE
500

| UE GROUP NAME | LOCATION | ATTRIBUTE |
|---|---|---|
| UE GROUP 1 | BASE 1 | VEHICLE |
| UE GROUP 2 | BASE 2 | ROBOT |
| ... | ... | ... |

FIRST NETWORK TEMPLATE TABLE
600

| NETWORK TYPE 601 | NUMBER OF UEs 602 | SETTING PARAMETER 603 | SLA PARAMETER 604 |
|---|---|---|---|
| NETWORK TYPE 1 | 0-100 | INSTANCE SIZE small<br>NW BAND 10Mbps<br>COST ¥15,000/MONTH<br>. . . | PER $10^{-1}$ |
| NETWORK TYPE 1 | 0-100 | INSTANCE SIZE standard<br>NW BAND 10Mbps<br>COST ¥20,000/MONTH<br>. . . | PER $10^{-2}$ |
| NETWORK TYPE 1 | 0-100 | INSTANCE SIZE large<br>NW BAND 50Mbps<br>COST ¥30,000/MONTH<br>. . . | PER $10^{-2}$ |
| NETWORK TYPE 2 | 0-100 | INSTANCE SIZE large<br>NW BAND 100Mbps<br>COST ¥100,000/MONTH<br>. . . | PER $10^{-4}$ |
| NETWORK TYPE 2 | 0-100 | INSTANCE SIZE xlarge<br>NW BAND 100Mbps<br>COST ¥130,000/MONTH<br>. . . | PER $10^{-4}$ |
| . . . | . . . | . . . | . . . |

FIG. 7

SECOND NETWORK TEMPLATE TABLE
700

| NETWORK TYPE | TUNING POLICY | CHECK CONTENT | ON-VIOLATION ACTION |
|---|---|---|---|
| | | 701 | 702 703 704 |
| NETWORK TYPE 1 | TUNING POLICY 1 | • RESOURCE IS EXPANDED WHEN PER IS MORE THAN OR EQUAL TO $10^{-2}$/MONTH<br>• RESOURCE IS EXPANDED WHEN A SITUATION IN WHICH PER EXCEEDS $10^{-4}$ CONTINUES FOR SEVERAL HOURS<br>• RESOURCE IS EXPANDED WHEN A SITUATION IN WHICH A BAND USAGE RATE ON WEEKDAYS IS MORE THAN OR EQUAL TO AN AVERAGE OF 80% CONTINUES.<br>• RESOURCE IS CONTRACTED WHEN A BAND USAGE RATE ON WEEKDAYS IS LESS THAN OR EQUAL TO AN AVERAGE OF 30% CONTINUES.<br>• EXPANSION PROCESSING AND CONTRACTION PROCESSING ARE AUTOMATICALLY EXECUTED. | • DURING EXPANSION DETECTION: NOTIFICATION + AUTOMATIC SETTING FOR USER<br>• DURING CONTRACTION DETECTION: NOTIFICATION + AUTOMATIC SETTING FOR USER |
| NETWORK TYPE 2 | TUNING POLICY 2 | • BAND IS EXPANDED IN CASE USAGE TIME OF UPPER LIMIT BAND IS MORE THAN OR EQUAL TO 10%.<br>• REPORTING OR RECOMMENDATION IS GIVEN TO USER WHEN USAGE RATE OF RESOURCE OR BAND IS LESS THAN OR EQUAL TO 30%.<br>• EXPANSION PROCESSING IS AUTOMATICALLY EXECUTED. CONTRACTION PROCESSING IS EXECUTED FOR ONLY VISUALIZATION AND RECOMMENDATION. | • DURING EXPANSION DETECTION: NOTIFICATION + AUTOMATIC SETTING FOR USER<br>• DURING CONTRACTION DETECTION: NOTIFICATION + AUTOMATIC SETTING FOR USER |
| ... | ... | ... | ... |
| NETWORK TYPE any | TUNING POLICY 999 | • TUNING IS NOT PERFORMED (SETTING PARAMETER DOES NOT CHANGE) | - |

FIG. 8

FIRST PROFILE TABLE
800

| REQUIREMENT ID | BASIC REQUIREMENT | NW BAND | TIME ZONE | BURST TIME | NUMBER OF TIMES OF LOW EVALUATION | NUMBER OF TIMES OF SHORTAGE |
|---|---|---|---|---|---|---|
| 801 | 802 | 803 | 804 | 805 | 806 | 807 |
| 1-1 | APPLICATION 1 UE GROUP 1 NUMBER OF UEs 100 | 10Mbps | X MONTH X DATE 9:00-10:00 | 5m | 5 | 5 |
| 1-1 | APPLICATION 1 UE GROUP 1 NUMBER OF UEs 100 | 10Mbps | X MONTH X DATE 11:00-12:00 | 2m | 2 | 2 |
| 1-1 | APPLICATION 1 UE GROUP 1 NUMBER OF UEs 100 | 10Mbps | X MONTH X DATE 14:00-15:00 | 1m | 0 | 0 |
| 1-1 | APPLICATION 1 UE GROUP 1 NUMBER OF UEs 100 | 10Mbps | X MONTH X DATE 15:00-16:00 | 0m | 2 | 0 |
| ... | ... | ... | ... | ... | ... | ... |

FIG. 11

SECOND PROFILE TABLE
1100

| REQUIREMENT ID | BASIC REQUIREMENT | MAXIMUM BURST TIME | ESTIMATED BAND |
|---|---|---|---|
| 1101 | 1102 | 1103 | 1104 |
| 1-1 | APPLICATION 1<br>UE GROUP 1<br>NUMBER OF UEs 100 | 5m | 50Mbps |

FIG. 12

THIRD PROFILE TABLE
1200

| REQUIREMENT ID | BASIC REQUIREMENT | ESTIMATED BAND | STATISTICS |
|---|---|---|---|
| 1201 | 1202 | 1203 | 1204 |
| 1-1 | APPLICATION 1<br>UE GROUP 1<br>NUMBER OF UEs 100 | 50Mbps | PRESENCE |
| 1-2 | APPLICATION 1<br>UE GROUP 1<br>NUMBER OF UEs 200 | 100Mbps | PRESENCE |
| 1-3 | APPLICATION 1<br>UE GROUP 1<br>NUMBER OF UEs 300 | -<br>-><br>150Mbps | ABSENCE |

FIG. 13

FOURTH PROFILE TABLE
1300

|  | 1301 | 1302 | 1303 | 1304 |
|---|---|---|---|---|
|  | REQUIREMENT ID | BASIC REQUIREMENT | SETTING INSTANCE | UPDATE INSTANCE |
|  | 1-1 | APPLICATION 1 UE GROUP 1 NUMBER OF UEs 100 | standard | medium |
|  | ... | ... | ... | ... |

FIG. 14

FIFTH PROFILE TABLE
1400

| 1401 | 1402 | 1403 | 1404 | 1405 | 1406 |
|---|---|---|---|---|---|
| REQUIREMENT ID | BASIC REQUIREMENT | PROCESSOR | MEMORY | RECOMMENDED INSTANCE | STATISTICS |
| 1-1 | APPLICATION 1 UE GROUP 1 NUMBER OF UEs 100 | 80% | 12GB | medium | PRESENCE |
| 1-2 | APPLICATION 1 UE GROUP 1 NUMBER OF UEs 200 | 160% | 24GB | large | PRESENCE |
| 1-3 | APPLICATION 1 UE GROUP 1 NUMBER OF UEs 300 | 240% | 36GB | xlarge | ABSENCE |

NETWORK MANAGEMENT SYSTEM, NETWORK MANAGEMENT METHOD, AND COMPUTER PROGRAM

TECHNICAL FIELD

The present invention relates generally to management of a communication network and, in particular, to assistance in network setting.

BACKGROUND ART

The 5th-generation mobile communication (5G) enables low-delay, broadband, and highly-reliable wireless communication. Such wireless communication is introduced, and thus, various existing networks among private networks can be integrated, and it can be expected that costs of network construction and operation can be reduced.

It is desirable that a burden of the network setting related to the 5G be small. As a technique related to the assistance in the network setting, for example, network setting using a template is known (PTL 1).

CITATION LIST

Patent Literature

PTL 1: JP 2020-140276 A

SUMMARY OF INVENTION

Technical Problem

In the 5G, an edge server called a multi-access edge computing (MEC) is introduced in a location such as a site (or a station building of a communication carrier), and a network system can be installed in the location. The network system is a system including an edge server on which an application is executed and a core network of a mobile network connected to the edge server (may be present in a location away from the edge server and the core network).

Whether or not a parameter value group set in the network system is appropriate is not known until the operation of the network system in which the parameter value group is set is actually started. In a case where the parameter value group is inappropriate, it is necessary to change the set parameter value group.

The above-described problem may also be present in a wireless communication service other than the 5G, for example, a 6th-generation (6G) or long-term evolution (LTE) wireless communication service.

Solution to Problem

A network management system that manages a network system is constructed. The network management system selects one or more setting templates each associated with an application requirement suitable for an application requirement of a user from a plurality of setting templates each associated with an application requirement. The network management system sets a parameter value group determined by using a target setting template which is one setting template of the selected one or more setting templates in a network system. The parameter value group is a parameter value for each parameter item related to the network system. Each setting template includes a template parameter value group which is a template parameter value for each parameter item related to the network system. The template parameter value is a parameter value as a template. The network management system updates the target setting template based on a result of the monitoring or sets at least one template parameter value displayed based on the target setting template.

Advantageous Effects of Invention

According to the present invention, it is possible to reduce a possibility that the set parameter value group needs to be changed after the parameter value group is set in the network system.

BRIEF DESCRIPTION OF DRAWINGS

FIG. 4 illustrates a configuration example of an application requirement table.

FIG. 5 illustrates a configuration example of a UE group table.

FIG. 6 illustrates a configuration example of a first network template table.

FIG. 7 illustrates a configuration example of a second network template table.

FIG. 8 illustrates a configuration example of a first profile table.

FIG. 11 illustrates a configuration example of a second profile table.

FIG. 12 illustrates a configuration example of a third profile table.

FIG. 13 illustrates a configuration example of a fourth profile table.

FIG. 14 illustrates a configuration example of a fifth profile table.

DESCRIPTION OF EMBODIMENTS

Figure 1:
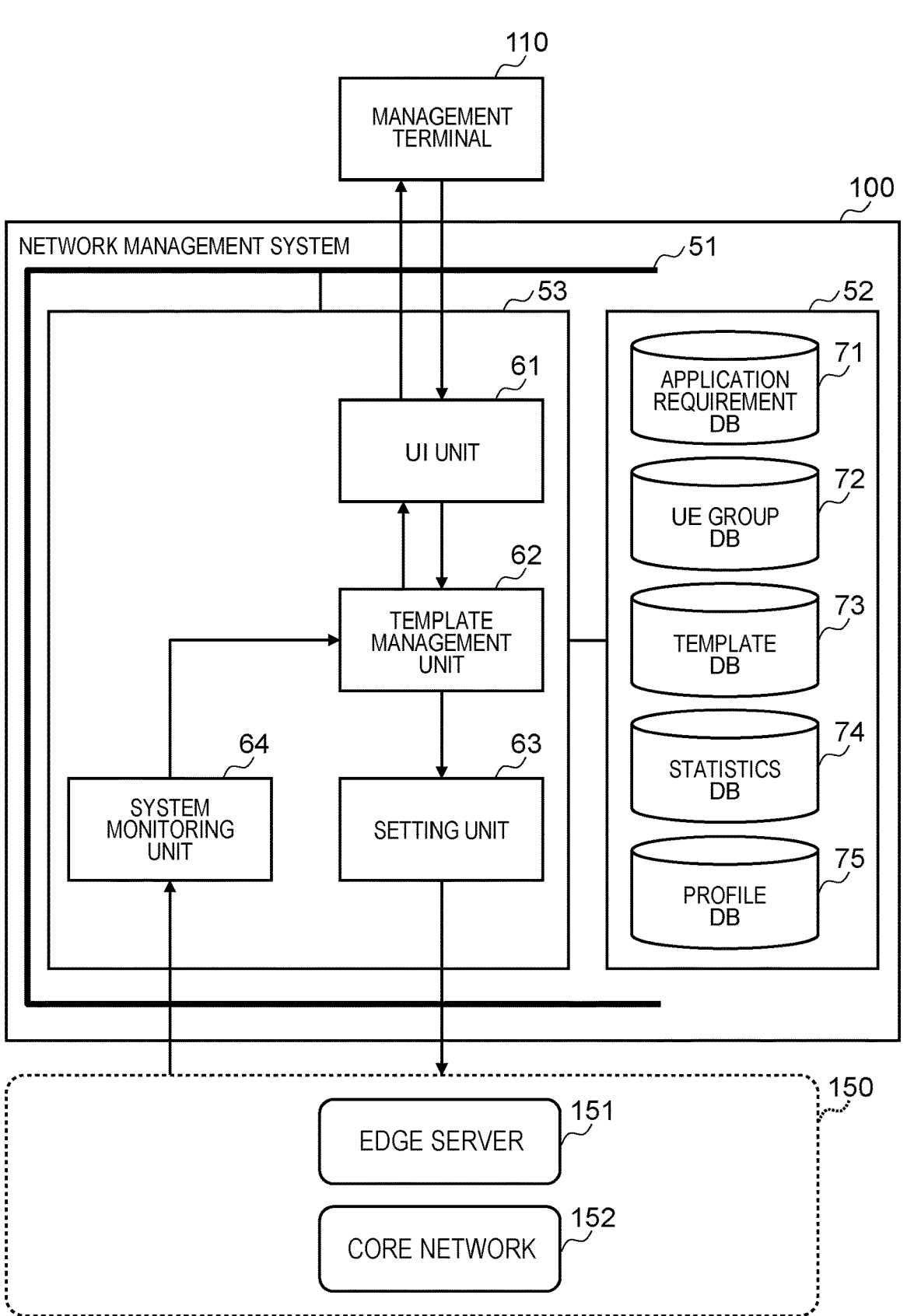
FIG. 1 illustrates a configuration example of an overall system according to an embodiment of the present invention.

In the following description, an "interface device" may be one or more interface devices. The one or more interface devices may be at least one of the following interface devices.

One or more input and output (I/O) interface devices. The input and output (I/O) interface device is an interface device for at least one of an I/O device and a remote computer for display. The I/O interface device for the computer for display may be a communication interface device. The at least one I/O device may be either a user interface device, for example, an input device such as a keyboard and a pointing device, or an output device such as a display device.

One or more communication interface devices. The one or more communication interface devices may be one or more communication interface devices of the same type (for example, one or more network interface cards (NIC)), or may be two or more communication interface devices of different types (for example, an NIC and a host bus adapter (HBA)).

Further, in the following description, a "memory" is one or more memory devices which are an example of one or more storage devices, and may be typically a main storage device. At least one memory device of the memory may be a volatile memory device, or may be a non-volatile memory device.

Further, in the following description, a "persistent storage device" may be one or more persistent storage devices which are an example of one or more storage devices. The persistent storage device is typically a non-volatile storage device (for example, auxiliary storage device), specifically, for example, a hard disk drive (HDD), a solid state drive (SSD), a Non-Volatile Memory Express (NVME) drive, or a storage class memory (SCM).

Further, in the following description, the "storage device" may be at least the memory and the persistent storage device.

Further, in the following description, a "processor" may be one or more processor devices. At least one processor device is typically a microprocessor device such as a central processing unit (CPU), but may be another type of processor device such as a graphics processing unit (GPU). At least one processor device may be a single-core processor device, or may be a multi-core processor device. At least one processor device may be a processor core. At least one processor device may be a processor device in a broad sense such as a circuit (for example, a field-programmable gate array (FPGA), a complex programmable logic device (CPLD), or an application specific integrated circuit (ASIC)) that is an aggregate of gate arrays by a hardware description language that performs part or all of processing.

Further, in the following description, although information that can be output for input may be described by an expression such as an "xxx DB" (DB stands for "database") or an "xxx table", the information may be data of any structure (for example, may be structured data or unstructured data), may be a neural network that generates an output for an input, or may be a learning model represented by a genetic algorithm or a random forest. Accordingly, the "xxx DB" or "xxx table" can be referred to as "xxx information". Further, in the following description, configurations of the DB and the table are provided as examples, and one DB (one table) may be divided into two or more DBs (two or more tables), or all or a part of two or more DBs (two or more tables) may be one DB (one table).

Further, in the following description, although functions may be described in terms of "yyy units", the functions may be realized by one or more computer programs being executed by the processor, may be realized by one or more hardware circuits (for example, FPGA or ASIC), or may be realized by a combination thereof. When the function is realized by the program being executed by the processor, since predetermined processing is performed while appropriately using the storage device and/or the interface device, the function may be at least a part of the processor. The processing described with the function as a subject may be processing performed by the processor or a device including the processor. The program may be installed from a program source. The program source may be, for example, a program distribution computer or a computer-readable storage medium (for example, a non-transitory storage medium). The description of each function is an example, and a plurality of functions may be combined into one function, or one function may be divided into a plurality of functions.

Further, in the following description, a common reference sign of reference signs will be used when the same kind of elements are described without distinguishing these elements, and reference signs may be used when the same kind of elements are distinguished.

Further, identification information for identifying an element such as an application requirement or a network type may be a combination of one or more of "name", "ID", "identifier", and "number".

FIG. 1 illustrates a configuration example of an entire system according to an embodiment of the present invention.

A network system 150 includes an edge server 151 on which an application is executed and a core network 152 (for example, a 5G core) of a mobile network connected to the edge server 151. The network system 150 may include at least a part of a mobile network. The mobile network may include a radio access network ((R)AN), a user plane function (UPF) server, a plurality of switches, a data network (DN), and the core network 152. The (R)AN may include a base station that wirelessly communicates with user equipment (UE) that is an example of a user device. The (R)AN and the UPF server may be connected to a mobile backhaul. The core network 152 may include functions such as an access and mobility management function (AMF), a session management function (SMF), a policy control function (PCF), and unified data management (UDM). Further, the network system 150 may include a local 5G of a company that does not have a wireless communication service. The local 5G may be installed in a site such as distribution or a factory. Further, the edge server 151 may be an edge server disposed at a site (base) or may be an edge server provided in a carrier network. The application is executed by the edge server 151.

A network management system 100 is a system that manages the network system 150. The network management system 100 is a physical computer system including one or more physical computers, but may be a logical computer system (for example, a system realized on a cloud infrastructure) based on a physical computer system.

The network management system 100 includes an interface device 51, a storage device 52, and a processor 53 connected thereto.

The interface device 51 is connected to be able to communicate with at least one element in the network system 150.

The storage device 52 stores information and a program. Examples of the information include an application requirement DB 71, a UE group DB 72, a template DB 73, a statistics DB 74, and a profile DB 75. The application requirement DB 71 stores information indicating an accepted application requirement. Information indicating a group of UEs is stored in the UE group DB 72. The template DB 73 stores information indicating a setting template associated with an application requirement. Typically, information indicating a plurality of setting templates each associated with an application requirement is stored in the template DB 73. Information indicating statistics on the network system 150 is stored in the statistics DB 74. Information indicating a profile of the application requirement is stored in the profile DB 75.

The processor 53 executes a program to realize a user interface (UI) unit 61, a template management unit 62, a setting unit 63, and a system monitoring unit 64.

The UI unit 61 accepts an input of an application requirement of a user. In the present embodiment, the input of the application requirement is accepted from ab administrator via a user interface (UI) to be described later displayed on a management terminal 110, but instead, the input of the application requirement may be accepted by reading from the storage device or by another method. The management terminal 110 may be a computer such as a personal computer or a smartphone. The "administrator" may be a person belonging to a user (for example, a company) or an administrator of the network management system 100. Further, the UI unit 61 provides a UI based on the setting template to the management terminal 110.

The template management unit 62 selects, from the template DB 73, one or more setting templates each associated with an application requirement conforming to the input application requirement. A target setting template which is one setting template of the selected one or more setting templates is manually or automatically selected. A parameter value group is manually or automatically determined by using the target setting template. The parameter value group is a parameter value for each parameter item related to the network system 150. Each setting template includes a template parameter value group that is a template parameter value for each parameter item related to the network system 150.

The setting unit 63 sets the parameter value group determined by using the target setting template in the network system 150 (deployment of the parameter value group).

Whether or not the parameter value group set in the network system 150 is appropriate is not known until an operation of the network system 150 in which the parameter value group is set is actually started. In a case where the parameter value group is inappropriate, it is necessary to change the set parameter value group.

The system monitoring unit 64 monitors a network status which is a status of the network system 150 in which the parameter value group is set. The "network status" may include, for example, a status of the edge server 151 (for example, a usage rate of a calculation resource) and a status of the network (for example, the number of communication packets, the number of packet discard, and a bandwidth usage rate). The template management unit 62 updates the above-described target setting template based on a monitoring result of the network status, or sets at least one template parameter value displayed based on the target setting template as a value based on the monitoring result of the network status. A case where the status of the network system 150 is monitored may include, for example, a case where information (for example, a response to a status inquiry (for example, inquiring of values for various information items) periodically transmitted to an element in the network system 150) that is periodically received from an element (for example, the edge server 151 or the core network 152) in the network system 150 is analyzed.

According to the present embodiment, the target setting template (or the template parameter value displayed based on the target setting template) is set as the setting template (or value) suitable for an operation result (actual status) of the network system 150. In other words, an initial parameter value group displayed for the administrator is learned based on the operation result of the network system 150. Thus, there is a high possibility that the parameter value group determined by using the target setting template is an appropriate parameter value group and thus, there is a reduced possibility that the necessity to change the set parameter value group occurs after the parameter value group is set in the network system 150.

Further, it is considered that it is necessary to flexibly reconstruct (for example, expansion or contraction) the network system 150 in response to a change in supply and demand (for example, changes in requirements from customers) and a change in site environment (for example, change in number of vehicles or robots operating in distributions or factories). Even though the network system 150 is reconstructed, a status corresponding to the reconstructed network system 150 is specified, and the target setting template (or the template parameter value displayed based on the target setting template) is set as the setting template (or value) based on the specified status. That is, it is possible to assist network setting following a configuration change of the network system 150.

Hereinafter, the present embodiment will be described in detail.

Figure 2:
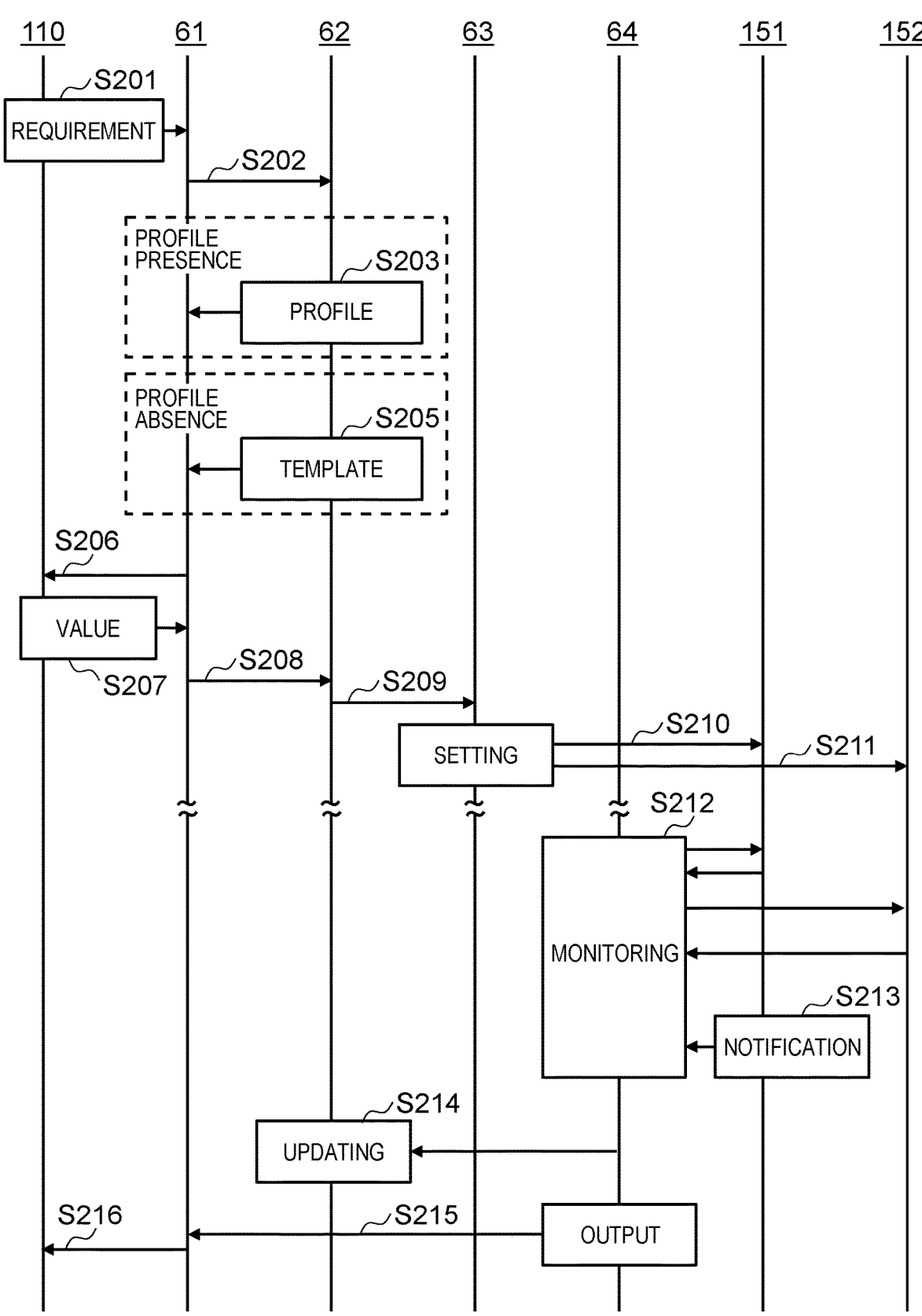
FIG. 2 illustrates an example of a flow of entire processing performed in the embodiment.

FIG. 2 illustrates an example of a flow of entire processing performed in the embodiment.

The UI unit 61 accepts an input of the information indicating the application requirement from the administrator via the UI provided by the UI unit 61 and displayed on the management terminal 110 (S201), and outputs the accepted information to the template management unit 62 (S202). The application requirement includes a network type (for example, a control network or an office network) and a basic requirement (for example, an application name and the number of UEs).

In a case where the profile of the input application requirement (the application requirement indicated by the information from the UI unit 61) is stored in the profile DB 75, the template management unit 62 outputs profile-based information for display to the UI unit 61. The profile-based information for display is information including a value based on a candidate setting template and to which the profile is applied. The "candidate setting template" is a setting template associated with an application requirement identical or similar to the input application requirement. The profile-based information for display is based on the application requirement DB 71, the template DB 73, and the profile DB 75.

On the other hand, in a case where the profile of the input application requirement is not stored in the profile DB 75, the template management unit 62 outputs template-based information for display to the UI unit 61 (S205). The template-based information for display is information including the value based on the candidate setting template. The template-based information for display is based on the application requirement DB 71 and the template DB 73.

Both the profile-based information for display and the template-based information for display may include information indicating the candidate setting template. Further, the "application requirement similar to the input application requirement" may be an application requirement in which a difference from the input application requirement is equal to or less than a certain difference (for example, an application requirement having a feature in which a difference from a feature of the input application requirement is less than or equal to a certain difference).

Figure 3:
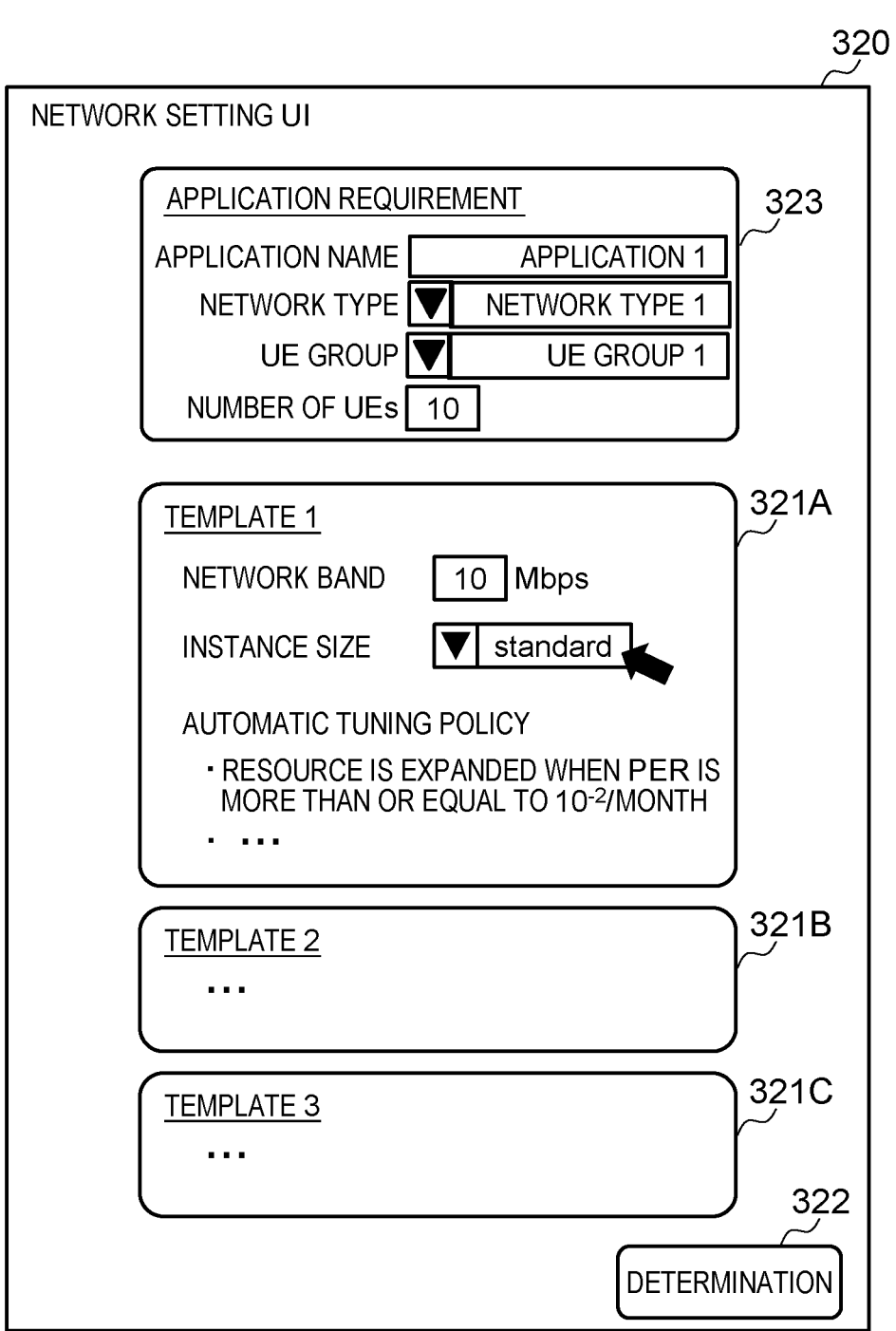
FIG. 3 illustrates an example of a network setting UI.

The UI unit 61 displays the information for display output in S203 or S205 on the management terminal 110 (S206). FIG. 3 illustrates an example of a network setting UI 320 including the information for display displayed in S206. The network setting UI 320 is typically a graphical user interface (GUI). The network setting UI 320 includes GUI components such as a requirement input form unit 323, one or a plurality of setting template objects 321 (for example, setting template objects 321A to 321C), and a determination button 322. The requirement input form unit 323 includes a GUI component that accepts an input of the application requirement (for example, an application name, a network type, a UE group, and the number of UEs). The setting template object 321 is a display object of the candidate setting template, and displays parameter values included in the information for display output in S203 or S205. For at least a part of the parameter values, there is a GUI component (for example, a text box or a pull-down menu) that accepts editing of the parameter values. Selection of the candidate setting template (selection of the setting template object 321) and pressing of the determination button 322 are accepted through the network setting UI 320. As a result, the parameter value group is input to the UI unit 61 for the selected candidate setting template. For the selected candidate setting template, the parameter value in the information for display is edited by the administrator. The selected candidate setting template is referred to as the "target setting template".

The UI unit 61 accepts an input of the parameter value group for the target setting template (S207), and outputs the accepted parameter value group to the template management unit 62 (S208). The template management unit 62 outputs the parameter value group to the setting unit 63 (S209). The setting unit 63 sets the parameter value group in the network system 150. Typically, the setting unit 63 sets a part of the parameter value group in the edge server 151 (S210), and sets the rest of the parameter value group in the core network 152 (S211).

The system monitoring unit 64 monitors the status of the network system 150 in which the parameter value group is set in S221 (S212).

In S212, the system monitoring unit 64 generates or updates a target profile that is the profile of the application requirement associated with the target setting template in accordance with the status of the network system 150. Specifically, for example, the system monitoring unit 64 acquires statistics of the status of the network system 150 and stores information indicating the acquired statistics in the statistics DB 74. The statistics DB 74 stores, for example, time-series information (for example, information indicating statistics for each time zone) for each of the following (a) to (c). An example of a status item is an item related to each of the statistics of (a) to (c).

(a) Computing statistics. Specifically, statistics of values for items related to calculation resources of the edge server 151 and the like. Items related to the computing statistics may be, for example, a processor usage rate, a memory usage amount, and a disk usage rate.

(b) Network statistics (for example, statistics on a per flow basis). Items related to the network statistics may be the number of communication packets, the number of lost packets (the number of lost packets), and the number of communication bytes.

(c) Statistics on NW evaluation notification. Items related to the statistics may be, for example, the number of times of low evaluation.

The system monitoring unit 64 generates or updates the target profile based on the statistics indicated by the statistics DB 74.

Further, the network management system 100 provides an interface (typically, an application programming interface (API) for receiving NW evaluation notification (notification indicating evaluation of the network used by the edge server

151) from the application. In a case where a predetermined event (for example, a communication timeout) is detected, an application executed in the edge server 151 can call an interface (API) thereof to send NW evaluation notification indicating that a performance requirement of the network may be violated to the network management system 100 (S213). The "predetermined event" mentioned here is an event defined as having a possibility occurring in a case where the performance requirement of the network is violated (for example, in a case where performance deteriorates). In S212, the system monitoring unit 64 appropriately receives the NW evaluation notification from the application (the edge server 151). The system monitoring unit 64 can generate or update the target profile or determine whether or not to generate or update the target profile based on the NW evaluation notification. For example, the system monitoring unit 64 generates or updates the target profile based on the NW evaluation notification and statistics related to the status of the network system 150 (for example, statistics related to the NW evaluation notification). Note that, the transmission source of the NW evaluation notification may be an element (for example, a UE that communicates with the edge server 151) other than the application executed by the edge server 151 instead of or in addition to the application. Further, the NW evaluation notification may include information indicating an application name, a requirement ID (application requirement ID), and network evaluation. Further, the NW evaluation notification may include information indicating the detected event (for example, packet delay, packet loss, and communication timeout with an opposing device) and information indicating an address (typically, an IP address) of the transmission source of the notification.

When the target profile is generated or updated, the system monitoring unit 64 instructs the template management unit 62 to update the target setting template. In response to the instruction, the template management unit 62 associates the target profile with the target setting template (S214). Thereafter, as the display based on the target setting template, the profile-based information for display is output in S203. Note that, the target profile may be reflected in the target setting template itself (that is, the template parameter value in the target setting profile is updated), and the information for display (template-based information for display) based on the updated target setting template may be output in S203.

Further, the system monitoring unit 64 may output notification information for the administrator (S215). The "notification information for the administrator" may include a report related to the status of the network system 150 or a recommendation of a parameter value group. The UI unit 61 may display the notification information on the management terminal 110 (S216).

According to the above flow, for the application requirement associated with the target setting template, the profile is generated or updated in accordance with the status of the network system 150 in which the parameter value group is set, and thereafter, the profile-based information for display is displayed for the parameter value group in response to the input of the application requirement (administrator intent). Thus, an appropriate parameter value group can be set with less burden on the administrator.

FIG. 4 illustrates a configuration example of an application requirement table 400.

The application requirement table 400 is a table in the application requirement DB 71. The application requirement table 400 has a record for each application requirement. The record has information such as a requirement ID 401, a basic requirement 402, a network type 403, a setting parameter 404, an SLA parameter 405, and a tuning policy 406. The basic requirement 402 and the network type 403 correspond to pieces of information indicating the application requirements. The setting parameter 404 corresponds to a parameter value group (or a value on which the parameter value group is based) with which the SLA parameter 405 and the tuning policy 406 are set in the network system 150. One application requirement is taken as an example.

The requirement ID 401 represents an ID of the application requirement. The ID of the application requirement may correspond to an example of information for identifying which network.

The basic requirement 402 indicates a basic element (for example, an application name, a UE group name, and the number of UEs) of the application requirement. The network type 403 indicates a name of the network type (in FIG. 4, is a name in a number such as "network type 1" or "network type 2", but a more comprehensible type name such as "control network" and "office network" may be used).

The setting parameter 404 is a parameter value (or a pointer to the parameter value) set for each of a plurality of parameter items or one parameter item. The setting parameter 404 may include at least one of a value indicating a communication characteristic (for example, delay or jitter), a value indicating a type of the calculation resource (for example, CPU, GPU, or FPGA), and a value indicating calculation performance per unit time.

The SLA parameter 405 is a parameter value of a parameter item belonging to a service level agreement (SLA) which is an example of network quality, and is, for example, a packet error rate (PER). The network quality may include a network delay or the like instead of or in addition to PER.

The tuning policy 702 indicates a name of a tuning policy for maintaining the network quality (in this example, maintaining an actual PER below PER as the parameter value).

FIG. 5 illustrates a configuration example of a UE group table 500.

The UE group table 500 is a table in the UE group DB 72. The UE group table 500 has a record for each UE group. The record has information such as a UE group name 501, a location 502, and an attribute 503. One UE group is taken as an example.

The UE group name 501 indicates a name of the UE group. The location 502 indicates a name of a location where the UE belonging to the UE group is present. The attribute 503 indicates an attribute of the UE belonging to the UE group (for example, a type of the UE).

The UE group name may be included in the basic requirement 402 (see FIG. 4) of the application requirement. At least one of the location 502 and the attribute 503 corresponding to the UE group name influences the status of the network system 150, and as a result, may influence a content of the profile corresponding to the status.

Further, the UE is a device that performs wireless communication through a base station and a mobile network, and is typically a device having a SIM card. The administrator may set the UE group name for each SIM instead of inputting the number of UEs belonging to the UE group in inputting the application requirement.

FIG. 6 illustrates a configuration example of a first network template table 600.

The first network template table 600 is a table in the template DB 73. The first network template table 600 has a record for each network type. The record has information such as a network type 601, the number of UEs 602, a setting parameter 603, and an SLA parameter 604. One network type is taken as an example.

The network type 601 represents a name of the network type. The number of UEs 602 indicates the number of UEs (or a range thereof).

The setting parameter 603 is a template parameter value (or a pointer to the template parameter value) for each of a plurality of parameter items or one parameter item. The SLA parameter 604 is, for example, PER.

According to the example illustrated in FIG. 6, one or more records are specified from the first network template table 600 by using the network type and the number of UEs of the application requirement as keys. There are a plurality of setting parameters 603 or one setting parameter for one network type. Initially, for example, a setting parameter 603 in a first record for an identical network type can be included in the information for display displayed on the UI. In a case where a profile is generated by monitoring the network system 150, another record is selected for the identical network type based on the profile, and the setting parameters 603 (or the setting parameter 603 updated based on the profile) in the another record can be included in the information for display displayed on the UI.

FIG. 7 illustrates a configuration example of a second network template table 700.

The second network template table 700 is a table in the template DB 73. The second network template table 700 has a record for each network type. The record has information such as a network type 701, a tuning policy 702, a check content 703, and an on-violation action 704. One network type is taken as an example.

The network type 701 indicates a name of the network type. The tuning policy 702 indicates a name of a tuning policy for maintaining the network quality (in this example, maintaining an actual PER below PER as the parameter value).

The check content 703 indicates a relationship between a violation status and a tuning content. The "violation status" is a status (a status of the network system 150) as a tuning execution condition.

The on-violation action 704 indicates a relationship between the tuning content and the action. According to the on-violation action 704, the template management unit 62 may specify, from the second network template table 700 through the system monitoring unit 64, the tuning content detected in monitoring the status of the network system 150, and may execute an action corresponding to the specified tuning content. As the action, for example, the violation status may be notified through the UI unit 61, or the parameter value group corresponding to the violation status may be updated based on the set parameter value group, and the updated parameter value group may be set through the setting unit 63.

According to the example illustrated in FIG. 7, the record is specified from the second network template table 700 by using the network type of the application requirement as a key.

Further, according to FIGS. 6 and 7, the setting template associated with the application requirement is described in the first and second network template tables. However, information constituting the setting template may be present in a table other than the first and second network template tables in the template DB 73.

Note that, the tuning policy for maintaining the network quality may be determined based on cost in the setting parameter 603 in addition to the network quality. The tuning policy may be prepared the viewpoint of both the cost and the network quality. In other words, the tuning policy may be defined from the viewpoint of how tuning is performed based on parameters such as the setting parameter 603 and the SLA parameter 604.

Further, a template parameter value acquired based on the setting parameter 603 or a parameter value obtained by applying the profile to the template parameter value is set in the network system 150. Parameter values based on the SLA parameter 604 and the tuning policy 702 may be set in the network system 150, and the network system 150 may perform automatic tuning based on the parameter values, or the system monitoring unit 64 may perform an action such as tuning the network system 150 based on the SLA parameter 604 and the tuning policy 702 (and the check content 703 and the on-violation action 704).

In the present embodiment, the system monitoring unit 64 acquires statistics related to the status of the network system 150 by monitoring the status of the network system 150 in which the parameter value group is set, and stores information indicating the acquired statistics in the statistics DB 74. Based on the statistics, the system monitoring unit 64 calculates a status value that is at least one of an estimated value and a recommended value for each of one or more status items related to the status of the network system 150. The profile includes a status value calculated for each of one or more status items. The parameter value displayed based on the target setting template is a value according to the status value calculated for the status item corresponding to the parameter item of the parameter value. In this manner, the profile including the status value influencing the displayed parameter value is generated based on the statistics related to the status of the network system 150. As a result, there is a high possibility that the displayed parameter value is appropriate, and thus, it is possible to set an appropriate parameter value group with small editing burden on the administrator.

In the present embodiment, tuning according to the tuning policy may be any of the following cases.

(x) The parameter value group set in the network system 150 includes a parameter value determined based on the tuning policy (specifically, for example, the check content 703 (see FIG. 7)) of the target setting template on which the parameter value group is based. The network system 150 tunes the network system 150 according to the parameter value (that is, according to the tuning policy) (for example, tunes the network system according to the check content 703). In monitoring the status of the network system 150, what kind of tuning has been performed is specified by the system monitoring unit 64.

(y) The system monitoring unit 64 tunes the network system 150 according to the tuning policy (specifically, for example, the check content 703 (see FIG. 7)) of the target setting template. For example, the system monitoring unit 64 determines whether or not the SLA indicated by the target setting template is maintained in the status of the network system 150 in which the parameter value group is set (for example, whether or not there is a PER that exceeds the PER indicated by the SLA parameter 604). In a case where the result of the determination is false, the system monitoring unit 64 tunes the network system 150 based on the tuning policy indicated by the target setting template.

In a case where the network system 150 is tuned, the system monitoring unit 64 determines the update of the parameter value group set in the network system 150, and generates or updates the profile of the application requirement associated with the target setting template based on the updated parameter value group.

The tuning policy corresponding to the tuning corresponds to the application requirement (for example, corresponds to cost and network quality), and the tuning is performed in accordance with an actual status of the network system 150. Thus, generation or update of an appropriate profile is expected.

In the present embodiment, for example, there are the following two cases (Case A) and (Case B).

(Case A) The status item and the parameter item are network bands, and the status value is an estimated value.

(Case B) The status item and the parameter item are instance sizes, and the status value is a recommended value.

(Case A) and (Case B) will be described. Note that, in the following description, there are first to fifth profile tables as examples of the tables in the profile DB 75, but a set of pieces of information acquired from the profile DB 75 (for example, the first to fifth profile tables) using the requirement ID of the application requirement as a key may be the profile of the application requirement.

<Case A: Network Band>

FIG. 8 illustrates a configuration example of a first profile table 800.

The first profile table 800 is a table in the profile DB 75. The first profile table 800 has a record for each time zone. The record has information such as a requirement ID 801, a basic requirement 802, an NW band 803, a time zone 804, a burst time 805, the number of times of low evaluation 806, and the number of times of shortage 807. A length as the time zone may be a certain length or may be different depending on the time zone. One time zone is taken as an example.

The requirement ID 801 indicates an ID of the application requirement. The application requirement is an application requirement corresponding to the statistics (statistics related to the status) related to the network system 150 in which the parameter value group is set and obtained for the time zone, and is an application requirement corresponding to the setting template on which the parameter value group is based. The basic requirement 802 indicates a basic element of the application requirement.

The NW band 803 indicates a network band as the parameter value in the parameter value group set for the application requirement.

The time zone 804 indicates a time zone (for example, date and times of the start and end of the time zone).

The burst time 805 indicates a time length during which burst traffic continues in the time zone. The number of times of low evaluation 806 indicates the number of NW evaluation notifications indicating low evaluation among NW evaluation notifications received in the time zone. The number of times of shortage 807 indicates the number of times it is determined that the network performance is insufficient for the time zone.

The system monitoring unit 64 counts, from the statistics DB 74, an occurrence time zone of burst traffic, a time zone in which the NW evaluation notification indicating low evaluation is notified, and an occurrence time zone of packet loss, and generates the first profile table 800 based on the aggregation result. The number of times of shortage 807 is incremented in a case where one or more of the following conditions are satisfied.

The time zone in which the NW evaluation notification indicating low evaluation is notified coincides with the time zone in which the burst traffic occurs (for example, an overlap ratio between these time zones is more than or equal to a certain value).

The time zone in which the NW evaluation notification indicating low evaluation is notified coincides with the occurrence time zone of packet loss (for example, an overlap ratio between these time zones is more than or equal to a certain value).

NW evaluation notifications indicating low evaluation are notified from a plurality of transmission sources.

PER (for example, a value obtained by dividing the number of lost packets by the number of communication packets) exceeds PER (threshold value) as SLA.

The occurrence time zone of the packet loss coincides with the occurrence time zone of the burst traffic (for example, the overlap ratio between these time zones is more than or equal to a certain value).

Figure 9:
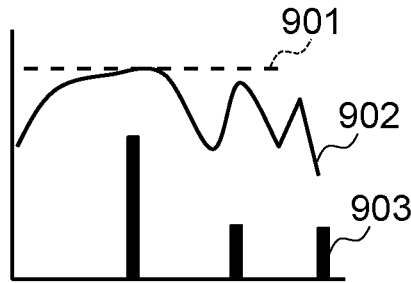
FIG. 9 illustrates an example of time series of a network band, a band usage rate, and the number of times of shortage.

A relationship illustrated in FIG. 9 is obtained based on the first profile table 800. According to FIG. 9, a horizontal axis is a time axis, and a vertical axis is an axis of a band and the number of times. Reference sign 901 indicates the set NW band 803 (an example of the set parameter value). Reference sign 902 indicates a time series of the band usage rate (an example of a time series of the status of the network system 150). Reference sign 903 indicates a time series of the number of times of low evaluation 806 or the number of times of shortage 807. In this manner, a correlation between the NW band 803 and the burst time 805 and the number of times of low evaluation 806 or the number of times of shortage 807 is specified.

Figure 10:
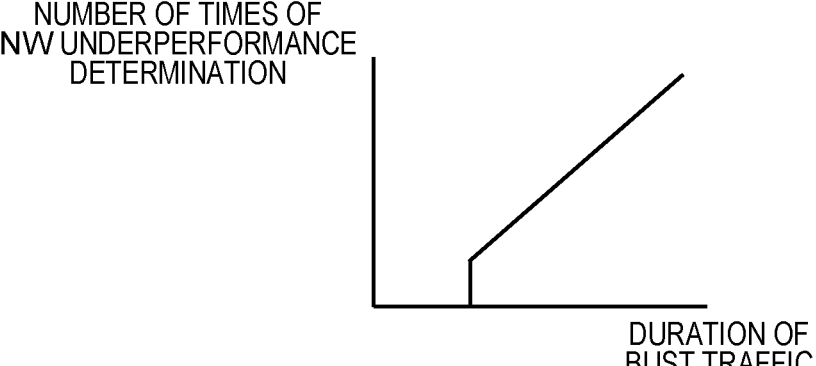
FIG. 10 illustrates an example of a relationship between a burst time and the number of times of shortage.

The system monitoring unit 64 estimates a threshold value of the burst time 805 at which the number of times of shortage 807 becomes "0". According to the example illustrated in FIG. 8, the estimated threshold value is "1 m" (1 minute). Further, according to FIG. 8, a relationship illustrated in FIG. 10 (a relationship between the burst time and the number of times of shortage) is obtained.

The system monitoring unit 64 calculates a necessary estimation band for a maximum burst time (a maximum value of the burst time) to be less than or equal to the threshold value. According to the example illustrated in FIG. 8, "5 m" is a maximum value of the burst time 805. It is estimated that five times the band (NW band "10 Mbps"× 5="50 Mbps") is required in order to set the burst time to be less than or equal to the threshold value "1 m". The system monitoring unit 64 generates a second profile table 1100 illustrated in FIG. 11 and stores the second profile table 1100 in the profile DB 75. The second profile table 1100 is a table in which a maximum burst time 1103 (information indicating the estimated maximum burst time) and an estimated band 1104 (information indicating the estimated network band), and corresponding requirement ID 1101 and basic requirement 1102 are recorded.

As described above, in (Case A), the target setting template includes the network band as the template parameter value, and the parameter value group set in the network system 150 includes the network band. The system monitoring unit 64 specifies the burst time and the number of times of shortage for each of the plurality of time zones based on the statistics DB 74. The system monitoring unit 64 estimates a burst time when the number of times of shortage becomes zero as a burst time threshold value based on the burst time and the number of times of shortage for each time zone. The system monitoring unit 64 estimates a network band for a maximum burst time among burst times in a plurality of time zones to be less than or equal to a burst time threshold value. The template management unit 62 sets, as the estimated network band, the network band in the target setting template or the network band displayed based on the target setting template. As a result, there is a high possibility that the network band displayed based on the target setting template is appropriate, and thus, the necessity to edit the network band is reduced.

Note that, the profile DB 75 stores a third profile table 1200 illustrated in FIG. 12. The third profile table 1200 has a record for each application requirement. The record has information such as a requirement ID 1201, a basic requirement 1202, an estimated band 1203, and statistics 1204. The requirement ID 1201 indicates an ID of the application requirement. The basic requirement 1202 indicates a basic element of the application requirement. The estimated band 1203 indicates the estimated network band. The statistics 1204 indicate the presence or absence of the statistics.

As can be seen from FIG. 12, the estimated band 1203 has been obtained for the requirement IDs "1-1" and "1-2" based on the statistics. The template management unit 62 calculates the estimated band 1203 for the application requirement corresponding to a record without statistics based on one or more statistical records. A record with statistics is a record of the statistics 1204 of "presence", and the record without statistics is a record of the statistics 1204 of "absence". For example, the estimated band 1203 of the record without statistics is calculated based on a difference between the basic requirement 1202 of the record without statistics and the basic requirement 1202 of the record with statistics and the estimated band 1203 of the record with statistics. According to the example illustrated in FIG. 12, a correlation between the number of UEs and the estimated band 1203 is calculated based on the profile of each of the number of UEs "100" and the number of UEs "200" for the identical application, and the estimated band 1203 (for example, "150 Mbps") in the profile of the number of UEs "300" is calculated based on the correlation.

Case A has been described above.

<Case B: Instance Size>

In a case where an instance of the application is updated in accordance with the parameter value (parameter value recommended to the administrator) displayed based on the monitoring result of the status of the network system 150 or an instance of the application is reset by the tuning according to the tuning policy, the template management unit 62 stores information indicating a size of the updated or reset instance in the profile DB 75. The information is recorded in a fourth profile table 1300 illustrated in FIG. 13 in the profile DB 75.

The fourth profile table 1300 has a record for each updated or reset instance. The record has information such as a requirement ID 1301, a basic requirement 1302, a setting instance 1303, and an update instance 1304.

The requirement ID 1301 represents an ID of an application requirement. The basic requirement 1302 represents a basic element of the application requirement.

The setting instance 1303 represents the size of the set instance. The update instance 1304 represents the size of the updated or reset instance.

The instance size (or the instance size displayed based on the setting template) in the setting template may be the instance size represented by the update instance 1304.

As described above, in (Case B), the target setting template includes the instance size as the template parameter value. The parameter value group set in the network system 150 includes an instance size. The instance size is a size of the application instance, and affects usage rate of a calculation resource (for example, a processor, a memory, and a disk) of the edge server 151. The system monitoring unit 64 detects that the instance size set in the network system 150 is changed by manual or automatic tuning by monitoring the status of the network system 150 in which the parameter value group is set, and records the changed instance size in the target profile (profile of application requirement associated with target setting template) as the recommended instance size. The template management unit 62 sets the instance size in the target setting template or the instance size displayed based on the target setting template as the recommended instance size. As a result, the instance size displayed based on the target setting template is likely to be appropriate, thus reducing the need to edit the instance size.

Note that, the profile DB 75 stores a fifth profile table 1400 illustrated in FIG. 14. The fifth profile table 1400 has a record for each application requirement. The record has information such as a requirement ID 1401, a basic requirement 1402, a processor 1403, a memory 1404, a recommended instance 1405, and statistics 1406. The requirement ID 1401 indicates an ID of the application requirement. The basic requirement 1402 indicates a basic element of the application requirement. The processor 1403 indicates a usage rate in a case where the processor is one core. The memory 1404 indicates an average usage amount of the memory. The recommended instance 1405 indicates a size of the recommended instance. The statistics 1406 indicate the presence or absence of the statistics. The processor 1403 and the memory 1404 are examples of the acquired statistics.

As can be seen from FIG. 14, the recommended instance 1405 has been obtained for the requirement IDs "1-1" and "1-2" based on the statistics including the processor 1403 and the memory 1404. The template management unit 62 calculates the recommended instance 1405 for the application requirement corresponding to the record without statistics based on one or more statistical records. For example, the template management unit 62 calculates a correlation between the number of UEs, the processor 1403, and the memory 1404 from the basic requirement 1402, the processor 1403, and the memory 1404 in the record with statistics of the requirement IDs "1-1" and "1-2". The template management unit 62 estimates the processor 1403 and the memory 1404 corresponding to the number of UEs "300" of the basic requirement 1402 in the record without statistics of the requirement ID "1-3" based on the correlation, and calculates the recommended instance 1405 based on the estimated processor 1403 and memory 1404.

Case B has been described above.

For both Cases A and B, the template management unit 62 specifies a correlation between the number of UEs and a statistics-based value (for example, the estimated band 1203 and the recommended instances 1405 (the processor 1403 and the memory 1404)) based on one or more statistics-based profiles (for example, a record with statistics) among profiles of a plurality of application requirements including the identical application. Based on the specified correlation, the template management unit 62 estimates a statistics-based value corresponding to the number of UEs in the application requirement including the identical application and having a non-statistics-based profile (for example, a record without statistics), and includes the estimated statistics-based value in the non-statistics-based profile. As a result, it can be expected that an appropriate profile is created or updated even for an application requirement for which statistics are not obtained.

Figure 15:
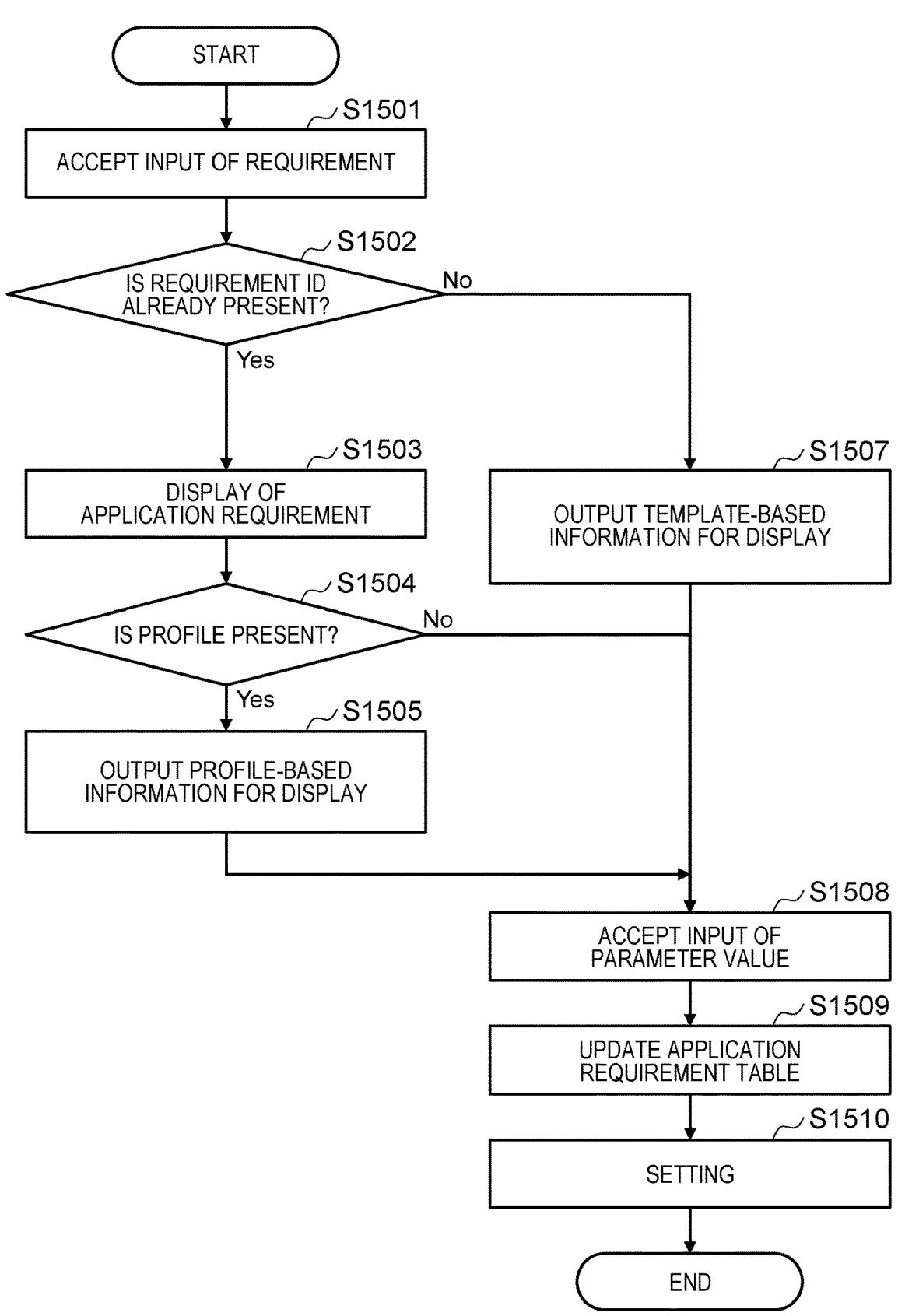
FIG. 15 illustrates an example of a flow of network setting assistance processing.

FIG. 15 illustrates an example of a flow of network setting assistance processing.

The UI unit 61 accepts an input of the application requirement (S1501). This input may be an input of a new application requirement, or may be an input of the requirement ID of the application requirement.

In a case where the input in S1501 is the input of the requirement ID and the requirement ID coinciding with the requirement ID is registered in the application requirement table 400 (S1502: Yes), the UI unit 61 specifies the application requirement coinciding with the requirement ID from the application requirement table 400 and displays information indicating the specified application requirement on the management terminal 110 (S1503). The template management unit 62 determines whether or not the profile of the application requirement is present by referring to the profile DB 65 (S1504). In a case where the determination result in S1504 is true (S1504: Yes), the template management unit 62 acquires the profile from the profile DB 65 and outputs the profile-based information for display to the UI unit 61 (S1505). The profile-based information for display includes the parameter value obtained by applying the value in the profile to the template parameter value of the target setting template (the setting template associated with the application requirement identical or similar to the specified application requirement). For example, in a case where the profile includes the estimated band calculated in the above Case A or the recommended instance size calculated in the above Case B, the network band or the instance size as the template parameter value of the target setting template may be updated to the estimated band or the recommended instance size, and the profile-based information for display may include the estimated band or the recommended instance size. The output profile-based information for display (information including the value to which the profile is applied) is displayed on the management terminal 110 by the UI unit 61.

In a case where the input in S1501 is a new application requirement, information indicating the application requirement is registered in the application requirement table 400 by the UI unit 61. The template management unit 62 specifies the target setting template (the setting template associated with the application requirement identical or similar to the input application requirement (for example, network type)) from the template DB 73, and outputs the template-based information for display that is information for display based on the target setting template (S1507). The output template-based information for display (information including the template parameter value) is displayed on the management terminal 110 by the UI unit 61.

The UI unit 61 accepts the parameter value group (for example, the parameter value as the setting parameter, a value of the SLA parameter, and a value of the tuning policy) for display of the profile-based or template-based information for display from the administrator (S1508). The accepted parameter value group includes one or both of the parameter value displayed without being edited by the administrator and the parameter value edited by the administrator. The template management unit 62 registers the input parameter value in the application requirement table 400 (S1509). The setting unit 63 sets the input parameter value group in the network system 150 (S1510).

Figure 16:
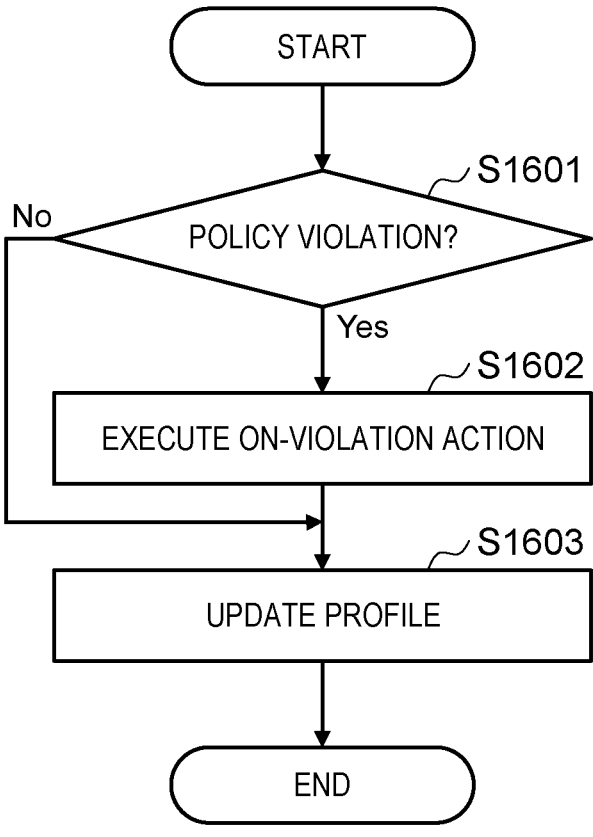
FIG. 16 illustrates an example of a flow of network status monitoring processing.

FIG. 16 illustrates an example of a flow of network status monitoring processing.

In a case where a policy violation (a violation status defined in the check content 703 of the set tuning policy) in monitoring the status of the network system 150 (S1601: Yes), the system monitoring unit 64 executes an action indicated by the on-violation action 704 (S1602). The system monitoring unit 64 updates the profile of the application requirement corresponding to the parameter value group set in the network system 150 (S1603).

In a case where the system monitoring unit 64 does not detect the policy violation in monitoring the status of the network system 150 (S1601: No), S1603 is performed without S1602.

Regardless of whether S1601 is Yes or No, the update of S1603 may be, for example, adding a record corresponding to a new time zone to the first profile table 800. In a case where S1601 is Yes, the update of S1603 may include a parameter value in the profile that reduces a possibility that a detected policy violation occurs.

Although the embodiment has been described above, the embodiment is merely an example for describing the present invention, and is not intended to limit the scope of the present invention to only the embodiment. The present invention can be executed in other various forms. For example, as periodic processing other than the periodic processing illustrated in FIG. 16, processing of creating a report including information on resource usage status in the network system 150 may be performed by the network management system 100.

REFERENCE SIGNS LIST

100 network management system

The invention claimed is:

1. A network management system, comprising:
a template management unit that selects one or more setting templates each associated with an application requirement suitable for an application requirement of a user from a plurality of setting templates each associated with an application requirement;
a setting unit that sets a parameter value group determined by using a target setting template which is one setting template of the selected one or more setting templates in a network system which is a system including an edge server on which an application is executed and a core network of a mobile network connected to the edge server; and
a system monitoring unit that monitors a status of the network system in which the parameter value group is set,
wherein the parameter group value is a parameter value for each parameter item related to the network system,
each setting template includes a template parameter value group which is a template parameter value for each parameter item related to the network system,
the template parameter value is a parameter value as a template,
the template management unit updates the target setting template based on a result of the monitoring or sets at least one template parameter value displayed based on the target setting template,
the system monitoring unit generates or updates a target profile which is a profile of an application requirement associated with the target setting template in accordance with the status of the network system in which the parameter value group is set,
the result of the monitoring includes the target profile,
each application requirement includes one application of a plurality of applications, and a number of user devices which are devices performing wireless communication via the mobile network,
the template management unit specifies a correlation between a statistics-based value and the number of user devices based on one or more statistics-based profiles among profiles of a plurality of application requirements including an identical application, and estimates a statistics-based value corresponding to the number of user devices in an application requirement including the identical application and in which a non-statistics-based profile is present based on the specified correlation, and includes the estimated statistics-based value to the non-statistics-based profile,
the statistics-based profile is a profile including a statistics-based value related to the status of the network system, and
the non-statistics-based profile is a profile that does not include the statistics-based value related to the status of the network system.

2. The network management system according to claim 1, wherein
the system monitoring unit acquires statistics related to the status of the network system by monitoring the status of the network system in which the parameter value group is set, and calculates a status value which is at least one of an estimated value and a recommended value for each of one or more status items related to the status of the network system based on the statistics,
the target profile includes the status value calculated from each of the one or more status items, and
the parameter value displayed based on the target setting template is a value according to a status value calculated for a status item corresponding to a parameter item of the parameter value.

3. The network management system according to claim 1, wherein
the target setting template includes an instance size as the template parameter value,
the parameter value group set in the network system includes an instance size,
the instance size is a size of an application instance, and influences a usage rate of a calculation resource of the edge server,
the system monitoring unit detects that the instance size set in the network system is changed by manual or automatic tuning by monitoring the status of the network system in which the parameter value group is set, and records the changed instance size in the target profile as a recommended instance size, and
the template management unit sets, as the recommended instance size, an instance size in the target setting template or an instance size displayed based on the target setting template.

4. The network management system according to claim 1, wherein
each application requirement includes one network type of a plurality of network types each influencing network quality,
each setting template indicates network quality depending on a network type included in an application requirement associated with the setting template, and a tuning policy for maintaining the network quality, and
the system monitoring unit generates or updates the target profile based on a parameter value group updated based on the status of the network system in which the parameter value group is set and the tuning policy indicated by the target setting template.

5. A network management system comprising:
a template management unit that selects one or more setting templates each associated with an application requirement suitable for an application requirement of a user from a plurality of setting templates each associated with an application requirement;

a setting unit that sets a parameter value group determined by using a target setting template which is one setting template of the selected one or more setting templates in a network system which is a system including an edge server on which an application is executed and a core network of a mobile network connected to the edge server; and a system monitoring unit that monitors a status of the network system in which the parameter value group is set, wherein the parameter group value is a parameter value for each parameter item related to the network system, each setting template includes a template parameter value group which is a template parameter value for each parameter item related to the network system, the template parameter value is a parameter value as a template, the template management unit updates the target setting template based on a result of the monitoring or sets at least one template parameter value displayed based on the target setting template, the system monitoring unit generates or updates a target profile which is a profile of an application requirement associated with the target setting template in accordance with the status of the network system in which the parameter value group is set, the result of the monitoring includes the target profile, the system monitoring unit acquires statistics related to the status of the network system by monitoring the status of the network system in which the parameter value group is set, and calculates a status value which is at least one of an estimated value and a recommended value for each of one or more status items related to the status of the network system based on the statistics, the target profile includes the status value calculated from each of the one or more status items, the parameter value displayed based on the target setting template is a value according to a status value calculated for a status item corresponding to a parameter item of the parameter value, the target setting template includes a network band as the template parameter value, the parameter value group set in the network system includes a network band, the system monitoring unit specifies a burst time and a number of times of shortage for each of a plurality of time zones based on the statistics, the burst time being a duration time of burst traffic, and the number of times of shortage being a number of times network performance is insufficient, estimates a burst time in which the number of times of shortage becomes zero as a burst time threshold value based on a burst time for each time zone and the number of times of shortage, and estimates a network band for a maximum burst time among burst times of the plurality of time zones less than or equal to the burst time threshold value, the calculated status value is the estimated network band, and the template management unit sets, as the estimated network band, a network band in the target setting template or a network band displayed based on the target setting template.

6. A network management method, comprising:

selecting, by a computer, one or more setting templates each associated with an application requirement suitable for an application requirement of a user from a plurality of setting templates each associated with an application requirement;

setting, by the computer, a parameter value group determined by using a target setting template which is one setting template of the selected one or more setting templates in a network system which is a system including an edge server on which an application is executed and a core network of a mobile network connected to the edge server, the parameter group value being a parameter value for each parameter item related to the network system, each setting template including a template parameter value group which is a template parameter value for each parameter item related to the network system, and the template parameter value being a parameter value as a template;

monitoring, by the computer, a status of the network system in which the parameter value group is set;

updating the target setting template based on a result of the monitoring or setting at least one template parameter value displayed based on the target setting template;

generating or updating a target profile which is a profile of an application requirement associated with the target setting template in accordance with the status of the network system in which the parameter value group is set;

wherein the result of the monitoring includes the target profile, each application requirement includes one application of a plurality of applications, and a number of user devices which are devices performing wireless communication via the mobile network;

specifying a correlation between a statistics-based value and the number of user devices based on one or more statistics-based profiles among profiles of a plurality of application requirements including an identical application; and estimating a statistics-based value corresponding to the number of user devices in an application requirement including the identical application and in which a non-statistics-based profile is present based on the specified correlation, and includes the estimated statistics-based value to the non-statistics-based profile;

wherein the statistics-based profile is a profile including a statistics-based value related to the status of the network system, and wherein the non-statistics-based profile is a profile that does not include the statistics-based value related to the status of the network system.

7. A non-transitory computer-readable medium storing a program that causes a computer to execute a method comprising:

selecting, by a computer, one or more setting templates each associated with an application requirement suitable for an application requirement of a user from a plurality of setting templates each associated with an application requirement;

setting, by the computer, a parameter value group determined by using a target setting template which is one setting template of the selected one or more setting templates in a network system which is a system including an edge server on which an application is executed and a core network of a mobile network connected to the edge server, the parameter group value being a parameter value for each parameter item related to the network system, each setting template including a template parameter value group which is a template parameter value for each parameter item related to the network system, and the template parameter value being a parameter value as a template;

monitoring, by the computer, a status of the network system in which the parameter value group is set;

updating the target setting template based on a result of the monitoring or setting at least one template parameter value displayed based on the target setting template;

generating or updating a target profile which is a profile of an application requirement associated with the target setting template in accordance with the status of the network system in which the parameter value group is set;

wherein the result of the monitoring includes the target profile, each application requirement includes one application of a plurality of applications, and a number of user devices which are devices performing wireless communication via the mobile network;

specifying a correlation between a statistics-based value and the number of user devices based on one or more statistics-based profiles among profiles of a plurality of application requirements including an identical application; and estimating a statistics-based value corresponding to the number of user devices in an application requirement including the identical application and in which a non-statistics-based profile is present based on the specified correlation, and includes the estimated statistics-based value to the non-statistics-based profile;

wherein the statistics-based profile is a profile including a statistics-based value related to the status of the network system, and wherein the non-statistics-based profile is a profile that does not include the statistics-based value related to the status of the network system.

* * * * *